(12) United States Patent
Satake et al.

(10) Patent No.: US 7,006,286 B2
(45) Date of Patent: Feb. 28, 2006

(54) OPTICAL MEMBER, METHOD FOR PRODUCING THE SAME, ADHESIVE OPTICAL MEMBER AND IMAGE VIEWING DISPLAY

(75) Inventors: Masayuki Satake, Ibaraki (JP); Akiko Ogasawara, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/783,035

(22) Filed: Feb. 23, 2004

(65) Prior Publication Data
US 2004/0212884 A1 Oct. 28, 2004

(30) Foreign Application Priority Data
Feb. 25, 2003 (JP) .............................. 2003-047022

(51) Int. Cl.
G02B 5/30 (2006.01)
B29D 7/01 (2006.01)
B32B 27/00 (2006.01)
B32B 31/18 (2006.01)

(52) U.S. Cl. .................... 359/491; 359/485; 359/900; 156/101; 156/107; 427/163.1; 264/1.34

(58) Field of Classification Search ................ 359/483, 359/485, 490, 491, 492, 513, 900; 349/96; 156/101, 107; 427/163.1; 264/1.34, 1.35
See application file for complete search history.

(56) References Cited

U.S. PATENT DOCUMENTS

| | | | | | |
|---|---|---|---|---|---|
| 3,859,131 | A | * | 1/1975 | Miles | 427/163.1 |
| 4,061,418 | A | * | 12/1977 | Poensgen | 349/96 |
| 4,789,211 | A | * | 12/1988 | Wreede | 359/3 |
| 4,865,668 | A | * | 9/1989 | Goepfert et al. | 156/74 |
| 5,164,227 | A | | 11/1992 | Miekka et al. | |
| 6,204,906 | B1 | * | 3/2001 | Tannas, Jr. | 349/153 |
| 6,414,790 | B1 | * | 7/2002 | Bennett | 359/485 |
| 6,831,713 | B1 | * | 12/2004 | Sugino et al. | 349/96 |
| 2003/0095331 | A1 | * | 5/2003 | Bengoechea et al. | 359/494 |

FOREIGN PATENT DOCUMENTS

JP 60-069602 A * 4/1985

(Continued)

OTHER PUBLICATIONS

PTO 2005-3072, "Transparent Conductive Film, Optical Filter and Its Manufacturing Method", translation of JP 2002-313140 A (Mitsui Chemicals Inc.), Schreiber Translations, Inc., U.S. Patent and Trademark Office, Washington D.C., May 2005.*

Primary Examiner—John Juba, Jr.
(74) Attorney, Agent, or Firm—Westerman, Hattori, Daniels & Adrian LLP

(57) ABSTRACT

An optical member comprising an at least one optical film, wherein an end face of the at least one optical film is covered with water-repellent materials, is useful to suppress occurrence of defects concerning the optical film, in particular, defects concerning polarizer, which are caused under an atmosphere with high temperature and high humidity.

10 Claims, 1 Drawing Sheet

FOREIGN PATENT DOCUMENTS

| | | | |
|---|---|---|---|
| JP | 60-083903 A | * | 5/1985 |
| JP | 62-296112 A | * | 12/1987 |
| JP | 03-061983 | | 3/1991 |
| JP | 08-068907 | | 3/1996 |
| JP | 8-320485 | | 12/1996 |
| JP | 10-073719 A | * | 3/1998 |
| JP | 11-129355 | | 5/1999 |
| JP | 11-254550 | | 9/1999 |
| JP | 2000-258628 | | 9/2000 |
| JP | 2002-313140 A | * | 10/2002 |
| WO | WO 92/07723 | | 5/1992 |

* cited by examiner

OPTICAL MEMBER, METHOD FOR PRODUCING THE SAME, ADHESIVE OPTICAL MEMBER AND IMAGE VIEWING DISPLAY

BACKGROUND OF THE INVENTION

1. Field of the Invention

The present invention relates to an optical member that has an optical film with an end face covered by a water-repellent material and has improved water resistance. Especially this invention relates to an optical member comprising a polarizing plate including a polarizer whose end face of is covered by a water-repellent material. Moreover, this invention relates to a method for producing the optical member. Moreover, this invention relates to an adhesive optical member, which an adhesive layer is prepared on the optical member and furthermore this invention relates to an image viewing displays such as a liquid crystal display, an organic electroluminescence display, and a PDP, using the optical member or the adhesive optical member.

2. Description of the Related Art

In liquid crystal displays, due to the image picture displaying system thereof, disposition of a polarizer on both sides of a glass substrate provided on a top surface of a liquid crystal panel is inevitably required. Therefore, in general, a polarizer is used with protective films laminated thereto as a polarizing plate. Moreover, in order to improve display quality of displays, optical members laminating various optical films on polarizing plates are increasingly used. For example, a retardation film for coloring prevention, a viewing angle compensation film for improving viewing angle of liquid crystal displays, and moreover brightness enhancement films for improving contrast of displays etc. are used.

Optical films such as the polarizing plate are cut into a predetermined size adapted to image viewing displays such as liquid crystal displays, and are supplied as an article of manufacture.

As the polarizer, a film made of polyvinyl alcohol as a main material is impregnated with dichroism materials such as iodine or dyes, and subsequently stretched to be used. Moreover, as a material of a protective film, triacetyl celluloses, polyethylene terephthalates, and acrylics based resins, polycarbonates, norbornene-based resins, etc. are used. However, polyvinyl alcohol that is a main material of the polarizer is a material having high hydrophilic property, and is swelled and dissolved during long time water immersion. Although protective films protect both side surfaces of a polarizer, a cut end face (cut plane) of the cut optical film exposes the bare polarizer.

Therefore, when an optical member including hydrophilic materials, such as a polarizer, is left standing under an atmosphere with high temperature and high humidity for a long time, or when water contacts the end face of the optical member caused by dew condensation etc., swelling, dissolution, etc. of the polarizer (especially hydrophilic materials, such as polyvinyl alcohol) is occurred, and in consequence, an original shape of the optical member cannot be maintained. Which, as a result, may occasionally raise defects such as increased transmittance as an optical member, decolorization etc.

As technique for improving properties of cut end faces of optical members, a technique for solving defect concerning an adhesive layer of an adhesive type optical member having an adhesive layer(s) provided therein is proposed. For example, Japanese Patent Laid-Open No. 11-129355, Japanese Patent Laid-Open No. 11-254550, and Japanese Patent Laid-Open No. 2000-258628. Japanese Patent Laid-Open No. 11-129355 discloses a technique for forming layer with thermoplastic resin powders to an edge side of an adhesive layer, and Japanese Patent Laid-Open No. 11-254550 discloses a coating technique for an end face of an optical member with non-adhesive layer. Moreover, Japanese Patent Laid-Open No. 2000-258628 discloses a technique of attaching powders to an edge side of an adhesive layer. Such techniques aim at preventing defects resulting from pollution by protrusion and deposition of the adhesives by covering the adhesive layer exposed open in the end face.

Moreover, a liquid crystal display is disclosed in which a periphery of a polarizing plate attached on a transparent substrate of a liquid crystal cell is covered with sealants (Japanese Patent Laid-Open No. 8-320485). However, in a liquid crystal display panel where a narrower edge and an expanded display area are increasingly required, application of the liquid crystal display described in Japanese Patent Laid-Open No. 8-320485 increases possibility of exposure of section covered by the sealant. Which as a result, disables prevention of defects of the optical member by exposing a section of sealing member.

SUMMARY OF THE INVENTION

The present invention aims at providing an optical member that can suppress occurrence of defects concerning the optical film, in particular, defects concerning polarizer, which are caused under an atmosphere with high temperature and high humidity, and providing a method producing the same. Moreover, this invention aims at providing an adhesive optical member with an adhesive layer prepared thereon, and also at providing an image viewing display using the optical member or the adhesive optical member.

The present inventors performed wholehearted research in order to solve the above-mentioned problems and found out that the objects of this invention can be attained by optical members as shown below, leading to a completion of this invention.

That is, this invention relates to an optical member comprising an at least one optical film, wherein an end face of the at least one optical film is covered with water-repellent materials.

As the optical member, an embodiment is preferable in which an optical film comprises a polarizing plate and at least an end face of the polarizing plate is covered with water-repellent materials. Moreover, as the optical member, an embodiment is preferable in which an optical film comprises a polarizing plate including a polarizer made of polyvinyl alcohol as a main material and at least an end face of the polarizing plate is covered with water-repellent materials.

In the optical member, fluorine materials may be suitably used as the water-repellent materials.

Moreover, this invention relates to a method for producing the optical member, comprising a step of: die-cutting an optical film with a cutting blade onto which is beforehand coated by a water-repellent material so that the water-repellent material is attached onto an end face of the optical film simultaneously with die-cutting to form a covering layer.

Moreover, this invention relates to an adhesive optical member comprising an adhesive layer at least on one side of the optical member.

Furthermore, this invention relates to an image viewing display using at least one of the optical member or the adhesive optical member.

(Function and Effect)

In the above-mentioned optical member of this invention, an end face of the optical film conventionally exposed open is covered with a water-repellent material, which can improves water resistance in the end face, and can suppress defects concerning optical films caused under atmosphere with high temperature and high humidity. Moreover, since covering of the end face of the optical film has suppressed the defect, the optical film plane is not supposed to cause defects exposing a sealant covering a periphery on the optical film plane. The optical film can be especially suitably applied to polarizing plates made of hydrophilic materials, in particular polarizing plates including polarizes made of polyvinyl alcohol as a main material, whose defects is suppressed to be caused under atmosphere with high temperature and high humidity concerning hydrophilic materials.

DESCRIPTION OF THE PREFERRED EMBODIMENTS

An optical member of the present invention has a covering layer with a water-repellent material, which coats at least in a part of an end face of an optical film. An optical member of this invention may comprise one optical film or a plurality of optical films as a laminated product, as long as it has an optical film. When the optical film is a laminated product, the covering layer formed on an end face of the optical film may be formed on an end face of a part of the optical films, and may be formed on all end faces of the laminated product. The optical film comprising a hydrophilic material is suitably applied to the optical film with a covering layer formed thereon.

Optical films used for forming liquid crystal displays etc. may be used as optical films that are applied to optical members of this invention, and types thereof are not especially limited. For example, polarizing plates may be mentioned as the optical films. This invention may suitably be applied for optical members utilizing, as an optical film, polarizer made of polyvinyl alcohol as a main material as mentioned above.

Figure 1:
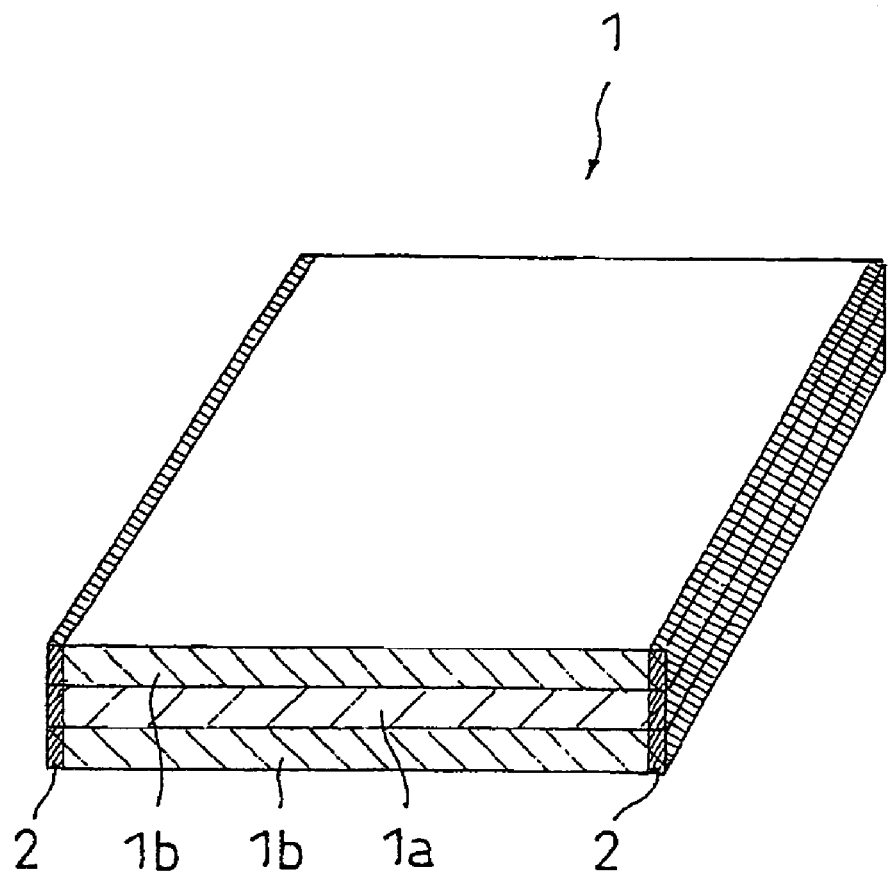
FIG. 1 shows a perspective sectional view of an optical member (polarizing plate) of the present invention.

FIG. 1 is a perspective sectional view of an optical member of this invention, using a polarizing plate as an optical film. In FIG. 1, end faces of a polarizing plate 1 having protective films 1b on both sides of a polarizer 1a have covering layers 2 of a water-repellent material. Although FIG. 1 illustrates a case where both of right and left end faces of the polarizing plate 1 have covering layers 2, as a matter of course, both of front and back end faces may also have covering layers. Moreover, the covering layers 2 are formed all over the end face of the polarizer 1a and the protective film 1b, the covering layers 2 may be formed only for the polarizer 1a.

Figure 2:
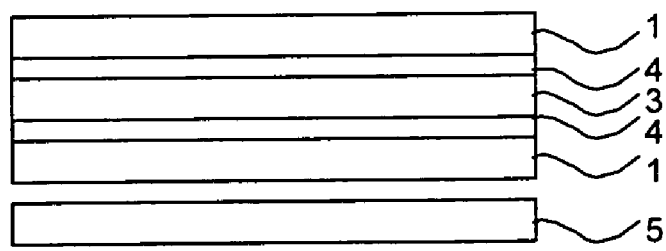
FIG. 2 is a schematic sectional view of an image display comprising an optical member of the present invention.

FIG. 2 shows schematically an image display comprising an optical member of the present invention in the form of polarizing plate 1. Respective polarizing plates 1 are attached on each side of a liquid crystal cell 3 by respective adhesive layers 4. The display is illuminated by a backlight 5.

As methods for covering an end face of an optical films (polarizing plate etc.) with a water-repellent material, for example, a method may be mentioned in which when the optical films (polarizing plate etc.) are die-cut into a predetermined size by cutting blades, such as a Thomson blade, a water-repellent material is beforehand coated onto the cutting blade, such as a Thomson blade, and thereby the water-repellent material is attached onto the end face simultaneously with cutting process to form an covering layer. Moreover, a method may also be mentioned in which after optical films (polarizing plate etc.) are die-cut into a predetermined size, two or more sheets (several to tens of to hundreds of sheets) are aligned and stacked up, then the water-repellent material is applied using brushes etc., or injected to the end face (side face) using a spraying method, an airbrush method, and an ink jet method, etc., to be attached, and thus an covering layer may be formed. In case of forming of covering layer(s) to optical films (polarizing plates etc.) aligned and stacked up, the optical film layers stacked up preferably are pressed down from a topmost part and a bottom part and/or side face on either side (sides not to be attached the water-repellent material).

In addition, when the optical film is a laminated product, covering layers may beforehand be formed only on the end faces of the optical film to which the covering layers are to be formed, in the laminated product, and subsequently, resulting film may be laminated with other optical films without covering layers currently formed. Alternatively, the covering layer(s) may be formed on all over end faces of the laminated product obtained by laminating a plurality of optical films.

Water-repellent materials are not especially limited, but various kinds of water-repellent materials may be used. Among covering materials, water-repellent materials improve water resistance of end faces, and can suppress degradation of polyvinyl alcohol as a main material of a polarizer in a polarizing plate. For example, as water-repellent materials, silicon based materials, fluorine based materials, long chain alkyl based materials, and etc. may be mentioned. Among these water-repellent materials, silicon based material in some cases may not be used in consideration of problems such as pollution concerning circuits of image viewing displays such as liquid crystal display. Since fluorine based material does not have such disadvantage, it may preferably be used. Moreover, as the water-repellent materials, materials may be used preferable for which reactivity with materials of optical films forming the covering layer is expected. For example, when an optical film includes a polarizing plate having a polarizer made of polyvinyl alcohol as a main material, an end face of the polarizer is to be covered, as a water-repellent material, a material, for which reactivity with polyvinyl alcohol is expected, for example, silane coupling agents, may suitable used. As silane coupling agents, silane coupling agents including fluorine (for example, trifluoro propyl trimethoxy silane etc.) may suitably use. Besides, these water-repellent materials diluted with volatile high solvents (for example, normal hexane, ethanol, isopropyl alcohol, etc.) may also be used.

A thickness of the covering layer formed on the end face of the optical film is appropriately adjusted by types, size, etc. of the optical film, and it is preferably usually about 0.5 $\mu$m or less, more preferably 0.001 to 0.5 $\mu$m, and still more preferably 0.001 to 0.2 $\mu$m.

As optical films used for an optical member of this invention, a polarizing plate may be mentioned. A polarizing plate usually has protective film(s) on one side or both sides of a polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 $\mu$m is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 $\mu$m or less, preferably 1 through 300 $\mu$m, and especially preferably 5 through 300 $\mu$m in viewpoint of strength, work handling and thin layer Moreover, it is preferable that the protective film may have as little coloring as possible. Accordingly, a protective film having a phase difference value in a film thickness direction represented by $Rth=[(nx+ny)/2-nz] \times d$ of $-90$ nm through $+75$ nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a phase difference value (Rth) of $-90$ nm through $+75$ nm in a thickness direction. The phase difference value (Rth) in a thickness direction is preferably $-80$ nm through $+60$ nm, and especially preferably $-70$ nm through $+45$ nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

An optical film of the present invention is especially no limitation about the optical layers, which may be used for formation of a liquid crystal display etc., such as a reflector, a transflective plate, a retardation plate (a half wavelength plate and a quarter wavelength plate included), and a viewing angle compensation film, may be used.

Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation film plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringent films obtained by uniaxially or biaxially stretched polymer materials, oriented films of liquid crystal polymers, oriented layers of liquid crystal polymers currently supported with films may be mentioned. A thickness of the retardation plate is also not especially limited, and it is about 20 to 150 µm in general.

As polymer material, for example, there may be mentioned: polyvinyl alcohols, polyvinyl butyrals, polymethyl vinyl ethers, polyhydroxy ethyl acrylates, hydroxyethyl celluloses, hydroxy propyl celluloses, methyl celluloses, polycarbonates, polyallylates, polysulfones, polyethylene terephthalates, polyethylene naphthalates, polyethersulfones, polyphenylene sulfides, polyphenylene oxides, polyallyl sulfones, polyamides, polyimides, polyolefins, polyvinyl chlorides, cellulose type polymers, and norbornene based resins, or binary or ternary copolymers, graft copolymers, and blend object thereof. These polymer materials are stretched to obtain an oriented object that is stretched film.

As liquid crystalline polymers, for example, various kinds of polymers of principal chain type and side chain type in which conjugated linear atomic groups (mesogens) conferring liquid crystalline orientation are introduced into a principal chain and a side chain of a polymer may be mentioned. As examples of principal chain type liquid crystalline polymers, polymers having a structure where mesogen groups are bonded by spacer parts conferring flexibility, for example, polyester based liquid crystalline polymers having nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain skeleton, and having mesogen parts comprising para-substituted cyclic compound units conferring nematic orientation property as side chains via spacer parts comprising conjugated atomic groups may be mentioned. These liquid crystal polymer, for example, is aligned by developing a solution of a liquid crystal polymer on an orientation treated surface where rubbing treatment was performed to a surface of thin films, such as polyimide and polyvinyl alcohol, formed on a glass plate, or where silicon oxide is deposited by an oblique evaporation method, and then by heat-treating.

Retardation plates that have suitable phase difference depending on the purpose of use, such as aiming at compensation of coloring or viewing angle using birefringence, for example, various wavelength plates and liquid crystal layers, may be used. In addition retardation plates in which two or more kinds of retardation plates are laminated together to control optical properties, such as phase difference may be used.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bi-directional stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

In the polarizing plate mentioned above and the optical film, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared as a layer in which pressure sensitive adhesives with different composition or different kind etc. are laminated together. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In addition, in the present invention, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical member of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned optical member has been located at one side or both sides of the liquid crystal cell, and with which a backlight or a reflector is used for a lighting system may be manufactured. In this case, the optical member by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLE

Although description in detail about this invention will, hereinafter, be given by using Examples, this invention is not limited at all by these Examples.

Example 1

As a polarizing plate, a film was used in which a protective film (triacetyl cellulose based film) with a thickness of 80 μm is attached on both sides of a polarizer (made of polyvinyl alcohol as a main material) with a thickness of 25 μm using a polyvinyl alcohol based adhesive of a thickness of 1 μm.

The above-mentioned polarizing plates 100 sheets, die-cut in 15-inch size, were stacked up together. The laminated polarizing plates (100 sheets) were clamped from both of upper and lower faces with vises. A fluorine based material (Fluorad FC-722, manufactured by Sumitomo 3M) as a water-repellent material was coated on whole side face and dried to form a covering layer with a thickness of 0.1 μm. On one side of the polarizing plate (one sheet each) with end face coated, an acrylic based adhesive with a thickness of 25 μm was laminated, and an adhesive type polarizing plate was produced.

Example 2

Except for having used trifluoro propyl trimethoxy silane (LS-1090, Shin-etsu Silicone Co., Ltd.) as a water-repellent material in Example 1, a same method as in Example 1 was used to produce a polarizing plate with end faces coated. Besides, using the resulting polarizing plate, an adhesive was laminated as in Example 1, to produce an adhesive type polarizing plate.

Example 3

An acrylic based adhesive with a thickness of 25 μm was laminated, as in Example 1, on a polarizing plate (before die-cutting) described in Example 1, to produce an adhesive type polarizing plate. This was die-cut in 15-inch size using a Thomson blade coated with a same fluorine based material as in Example 1.

Comparative Example 1

An adhesive was laminated on a polarizing plate (covering layers were not formed on end faces thereof) as in Example 1, to produce an adhesive type polarizing plate.

Waterproof test was performed for the adhesive type polarizing plates obtained in Examples and Comparative Example. In the waterproof test, after the adhesive type polarizing plates were attached on a glass plate, each obtained sample was immersed in warm water of 60° C. Each of the polarizing plates was measured for periods until decolorization of the end face began. The results are shown in Table 1.

TABLE 1

|  | Waterproof test |
|---|---|
| Example 1 | 60 minutes or more |
| Example 2 | 60 minutes or more |
| Example 3 | 60 minutes or more |
| Comparative example 1 | 30 minutes or less |

What is claimed is:

1. An optical member comprising an at least one optical film, wherein the optical film comprises a polarizing plate and at least an end face of the polarizing plate is covered with a water-repellent material having a thickness of from 0.001 to 0.5 μm.

2. The optical member according to claim 1, wherein the polarizing plate includes a polarizer made of polyvinyl alcohol as a main material and at least an end face of the polarizer is covered with a water-repellent material.

3. The optical member according to claim 1, wherein the water-repellent material is of fluorine materials.

4. A method for producing the optical member according to claim 1, comprising a step of: die-cutting an optical film with a cutting blade onto which is beforehand coated by a water-repellent material so that the water-repellent material is attached onto an end face of the optical film simultaneously with die-cutting to form a covering layer.

5. An adhesive optical member comprising an adhesive layer at least on one side of the optical member according to claim 1.

6. An image viewing display using at least one of the adhesive optical member according to claim 5.

7. An image viewing display using at least one of the optical member according to claim 1.

8. An optical film according to claim 1, wherein the thickness of the water-repellent material is from 0.001 to 0.2 μm.

9. An optical film according to claim 8, wherein the water-repellent material covers an end face but not main faces of the polarizing plate.

10. An optical film according to claim 1, wherein the water-repellent material covers an end face but not main faces of the polarizing plate.

* * * * *